US008983867B2

(12) United States Patent
Stibel et al.

(10) Patent No.: US 8,983,867 B2
(45) Date of Patent: *Mar. 17, 2015

(54) MULTI-DIMENSIONAL CREDIBILITY SCORING

(71) Applicant: Credibility Corp., Malibu, CA (US)

(72) Inventors: Jeffrey M. Stibel, Malibu, CA (US);
Wisdom Lu, Los Angeles, CA (US);
Aaron B. Stibel, Malibu, CA (US);
Judith G. Hackett, Malibu, CA (US);
Moujan Kazerani, Santa Monica, CA (US)

(73) Assignee: Credibility Corp., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,815

(22) Filed: Mar. 6, 2014

(65) Prior Publication Data

US 2014/0279394 A1    Sep. 18, 2014

Related U.S. Application Data

(63) Continuation of application No. 13/971,335, filed on Aug. 20, 2013, now Pat. No. 8,712,907.

(60) Provisional application No. 61/785,182, filed on Mar. 14, 2013.

(51) Int. Cl.
  *G06Q 40/00* (2012.01)
  *G06Q 40/02* (2012.01)
  *G06Q 30/02* (2012.01)

(52) U.S. Cl.
  CPC .......... *G06Q 40/025* (2013.01); *G06Q 30/0282* (2013.01)

USPC .................. 705/38; 705/39; 705/40; 705/41; 705/42; 705/43; 705/44

(58) Field of Classification Search
  CPC ....... G06Q 40/00; G06Q 30/00; G06Q 20/00; G06Q 50/00; G06Q 10/00
  USPC ...................................... 705/1–44
  See application file for complete search history.

(56) References Cited

U.S. PATENT DOCUMENTS

| | | | |
|---|---|---|---|
| 5,659,732 A | 8/1997 | Kirsch | |
| 6,950,809 B2 | 9/2005 | Dahan et al. | |
| 6,961,562 B2 | 11/2005 | Ross | |
| 7,072,841 B1 * | 7/2006 | Pednault | 705/4 |
| 7,369,999 B2 | 5/2008 | DuBois et al. | |
| 7,392,240 B2 | 6/2008 | Scriffignano et al. | |
| 7,584,188 B2 | 9/2009 | Scriffignano et al. | |
| 7,603,343 B2 | 10/2009 | von Ahn Arellano et al. | |
| 7,708,196 B2 | 5/2010 | Palmieri et al. | |
| 7,711,697 B2 | 5/2010 | Parry et al. | |
| 7,716,141 B2 | 5/2010 | Stewart et al. | |

(Continued)

*Primary Examiner* — Frantzy Poinvil
(74) *Attorney, Agent, or Firm* — Los Angeles Patent Group; Arman Katiraei

(57) ABSTRACT

A credibility scoring system produces a multi-dimensional entity credibility score that is derived from multiple dimensional component scores. The credibility scoring system derives each dimensional component score from a different set of credibility data pertaining to different dimensional aspect of overall credibility. The different dimensional aspects factoring into the overall credibility determination include a stability dimension, transparency dimension, trustworthiness dimension, and sentiment dimension.

20 Claims, 10 Drawing Sheets

(56) References Cited

U.S. PATENT DOCUMENTS

| | | |
|---|---|---|
| 7,822,757 B2 | 10/2010 | Stoker et al. |
| 7,848,979 B2 | 12/2010 | Sundararajan et al. |
| 7,962,461 B2 | 6/2011 | Ruhl et al. |
| 8,170,958 B1 | 5/2012 | Gremett et al. |
| 8,331,657 B2 | 12/2012 | Baker |
| 8,453,068 B2 * | 5/2013 | Stibel et al. .................. 715/780 |
| 8,615,520 B2 | 12/2013 | Fallah |
| 8,630,893 B2 * | 1/2014 | Stibel et al. .................. 705/7.32 |
| 8,712,907 B1 * | 4/2014 | Stibel et al. .................. 705/38 |
| 2002/0167919 A1 | 11/2002 | Marples et al. |
| 2003/0061232 A1 | 3/2003 | Patterson |
| 2003/0115133 A1 | 6/2003 | Bian |
| 2003/0117443 A1 | 6/2003 | Langner et al. |
| 2003/0120614 A1 | 6/2003 | Shumpert |
| 2004/0133501 A1 | 7/2004 | Parry et al. |
| 2004/0162742 A1 | 8/2004 | Stoker et al. |
| 2005/0010513 A1 | 1/2005 | Duckworth et al. |
| 2005/0015320 A1 | 1/2005 | Hayenhjelm et al. |
| 2005/0119961 A1 | 6/2005 | Tanzillo et al. |
| 2005/0130704 A1 | 6/2005 | McParland et al. |
| 2005/0131760 A1 | 6/2005 | Manning et al. |
| 2005/0192891 A1 | 9/2005 | Ferrera et al. |
| 2005/0240503 A1 | 10/2005 | Parker et al. |
| 2006/0020519 A1 | 1/2006 | Schroeder et al. |
| 2006/0129481 A1 | 6/2006 | Bhatt et al. |
| 2006/0195361 A1 | 8/2006 | Rosenberg |
| 2006/0270421 A1 | 11/2006 | Phillips et al. |
| 2007/0112667 A1 | 5/2007 | Rucker |
| 2007/0265995 A1 | 11/2007 | Remington et al. |
| 2008/0235174 A1 | 9/2008 | Scriffignano et al. |
| 2008/0249902 A1 | 10/2008 | Lehman et al. |
| 2009/0276233 A1 * | 11/2009 | Brimhall et al. .................. 705/1 |
| 2009/0319342 A1 | 12/2009 | Shilman et al. |
| 2010/0076968 A1 | 3/2010 | Boyns et al. |
| 2010/0079336 A1 | 4/2010 | Skibiski et al. |
| 2010/0095196 A1 | 4/2010 | Grabarnik et al. |
| 2011/0055173 A1 | 3/2011 | Stoker et al. |
| 2011/0087573 A1 | 4/2011 | Bahnck et al. |
| 2011/0153542 A1 | 6/2011 | Merugu et al. |
| 2011/0231282 A1 | 9/2011 | Dai |
| 2012/0246093 A1 * | 9/2012 | Stibel et al. .................. 705/347 |
| 2012/0301937 A1 | 11/2012 | Nilsson |

* cited by examiner

MULTI-DIMENSIONAL CREDIBILITY SCORING

CLAIM OF BENEFIT TO RELATED APPLICATIONS

This application is a continuation of U.S. non-provisional application Ser. No. 13/971,335 entitled "Multi-Dimensional Credibility Scoring", filed on Aug. 20, 2013 which claims the benefit of U.S. provisional application 61/785,182 entitled "Multi-Dimensional Credibility Scoring", filed Mar. 14, 2013. The contents of applications Ser. No. 13/971,335 and 61/785,182 are hereby incorporated by reference.

TECHNICAL FIELD

The present invention pertains to systems, methods, and processes for quantifying the credibility of an entity into a score.

BACKGROUND

Creditworthiness of individuals and businesses has long been a quantifiable measure from which many personal and commercial transactions are based. Creditworthiness is fundamentally a measure of risk for ascertaining the likelihood that an entity can pay its debt obligations in a timely manner.

Personal credit scores provided by credit agencies such as Experian, Transunion, and Equifax quantify the creditworthiness of an individual into a numerical score. This numerical score ranges from 300-850, with a higher score representing greater creditworthiness or lower risk of defaulting on debt obligations and a lower score representing lesser creditworthiness or higher risk of defaulting on debt obligations.

Business credit scores, also referred to as Paydex scores, are provided by various credit agencies. Like the personal credit score, the business credit score is a risk assessment indicator and is quantified as a numerical score. As the name suggests, business credit scores are provided for business entities and not individual entities. As used hereafter, the term entity will interchangeably refer to a business or an individual (i.e., person).

An entity's credit score is primarily derived from that entity's payment history. The payment history can be ascertained from various lenders that engage in commercial transactions with the entity, as well as vendors that provide payment history as to how quick and frequent an entity makes payments to its vendors. However, the closed nature of the credit reporting process limits who the contributors are. The contributors mainly include banks, credit card companies, vendors who provide trade references, and mortgage companies, while excluding individuals, small businesses, and other merchants.

Credit scores and creditworthiness have become standardized metrics that parties to a transaction look to when deciding to transact or when agreeing to terms. However, entities are now looking to transcend beyond risk assessment and consider other factors that are key to deciding whether to transact with another. This is especially true for the ordinary consumer who usually does not consider the creditworthiness of a business before transacting with that business.

Instead, the consumer is more concerned with whether the business provides quality goods and services, is responsive, and is trustworthy as some examples. Similarly, a small business relies less on its credit rating than its customers' experiences in gauging the likelihood of its success. For instance, whether a customer leaves satisfied with a service or a product is instrumental in determining whether that customer will return in the future or will provide referrals to encourage others to visit the small business. A sufficient number of good client experiences beneficially increases the exposure of the small business, thereby resulting in better chances of growth, success, and profitability irrespective of the business' credit score. Conversely, a sufficient number of bad client experiences can doom a small business irrespective of the business' credit score. The Internet has also allowed entities to easily reach beyond their geographic region and transact with other entities that are distributed anywhere in the world without ever meeting those entities. In such cases, the entities to a transaction are as equally or less concerned with the other entity's creditworthiness than they are about the trustworthiness, reputation, quality, timeliness, cleanliness, character, value, and other such factors. These and other factors constitute entity credibility.

Accordingly, credibility is a multi-dimensional measure that transcends risk. Entities may define credibility differently based on the factors that are important to them or the information that is available to them. The multi-dimensional nature has made it difficult to quantify and is the reason why there is no standard measure for credibility.

There is currently no service from which an entity can accurately, comprehensively, and readily ascertain its credibility. Some entities conduct surveys. Others look to various media to piece together their credibility. These media include newspaper and magazine reviews, client reviews that are posted on Internet websites such as www.yelp.com and www.citysearch.com, and complaints that are logged by the Better Business Bureau as some examples. It is very time consuming, inaccurate, and difficult for an entity to piece together its credibility in this manner. Moreover, even if an entity pieces together its credibility, there is no reference point from which the entity can get a relative perspective as to how its credibility compares to its peers.

As such, there is a need for a standardized score that transcends basic risk assessment. There is a need for such a score to quantifiably measure entity credibility, wherein credibility is derived comprehensively according to various dimensions factoring into credibility. Accordingly, there is a need to access and obtain credibility relevant data from multiple sources with the ability to perform a relative analysis of that data in order to produce different component scores relating to different credibility dimensions from which the overall credibility score of an entity can be derived.

SUMMARY OF THE INVENTION

It is an objective of the present invention to provide systems, methods, and machine implemented processes for deriving a score to quantify the credibility of an entity. It is further an objective to derive the credibility score in a multi-dimensional manner so as to comprehensively and holistically account for a range of factors affecting credibility.

Some embodiments implement a credibility scoring system to achieve these and other objectives. The credibility scoring system produces a multi-dimensional entity credibility score. The credibility scoring system derives the credibility score from multiple dimensional component scores. The credibility scoring system derives each dimensional component score from a different set of credibility data pertaining to different dimensional aspects of overall credibility. In some embodiments, the different dimensional aspects factoring into the overall credibility determination include a stability dimension, transparency dimension, trustworthiness dimension, and sentiment dimension.

The stability dimension factors the viability, longevity, and consistency of an entity. Greater credibility is attributed to an entity that has existed longer than its peers. From the stability dimension, one can glean the experience level of an entity. The credibility scoring system generates the stability dimension and the component score for the stability dimension based on historical data that is available for the entity. Some primary indicators for the stability dimension include the number of years that an entity has been in operation, the number of employees, annual revenues, demographic data, and industry.

The transparency dimension accounts for the ease in transacting with an entity based on available data documenting the entity's identity and policies. Greater credibility is attributed to an entity whose presence can be easily ascertained, can be readily contacted, and whose practices are well documented. In some embodiments, the credibility scoring system compiles the transparency dimension based on an online presence of the entity and based on data exposed about the entity through the online presence as some examples. Some primary indicators for the transparency dimension include whether the entity has a website, the entity's website lists contact information, key decision-makers, and various policies relevant to engaging with the entity.

The trustworthiness dimension factors the reputation of an entity. Greater credibility is attributed to an entity that is not involved in any investigations, legal actions, and is verified by various trusted sources. The trustworthiness dimension indicates how safe it is to engage with the entity. Some embodiments compile the trustworthiness dimension based on discovered legal actions, complaints that others have logged about the entity, and accreditations of the entity by others as some examples. Some primary indicators for the trustworthiness dimension include verifications or accreditations that trusted third parties have bestowed on the entity.

The sentiment dimension accounts for the experience that others have had in their engagement with the entity. Greater credibility is attributed when others have had a disproportionate number of positive experiences with the entity than those having a negative experience. Some embodiments compile the sentiment dimension based on reviews and ratings that others have posted about an entity on various online sites. The credibility scoring system performs natural language processing of these reviews and ratings in order to quantify the sentiment expressed therein. Some primary indicators for the sentiment dimension include the ratings and reviews that others have posted regarding their experiences with the entity.

The credibility scoring system generates the component scores for each dimension by feeding the aggregated data into a cluster computation. As part of the cluster computation, the credibility scoring system determines input necessary for a classification model for each of the dimensions. The classification model determines the primary data indicators for each dimension that most significantly impact that dimension. The primary data indicators as well as other ancillary data aggregated for a particular credibility dimension are then quantified into individual scores according to the classification model. The scoring can be based on the presence or absence of data as well as the values aggregated for the data indicators, wherein different encoded scoring rules determine the data value to score correlation. The individual scores are then compiled for each dimension and the distribution of the compiled set of scores for the entities is analyzed. The credibility scoring system then derives the dimensional component scores for the entities based on where their compiled score falls within the distribution. Based on this derivation, the dimensional component scores accurately capture how one entity compares to other entities across the different credibility dimensions. As such, the component credibility scores are not values within an arbitrary scale, but rather values that intrinsically qualify an entity amongst its peers or other entities along a particular credibility dimension.

The credibility scoring system derives the overall credibility score for a particular entity based on the entity's component credibility scores. In so doing, the credibility scoring system generates a credibility score that is comprehensive and holistic as a result of the various dimensions from which it is derived. The credibility score can then be sold as a tangible asset.

Moreover, some embodiments generate credibility reports that comprise the overall credibility score, each of the dimensional component scores, and the relevant credibility data from which the scores are derived. The credibility scoring system also engages entities in the credibility score derivation by allowing entities to submit corrections to incorrectly aggregated or matched data and to submit additional data that is otherwise unavailable or unattainable by the credibility scoring system.

BRIEF DESCRIPTION OF THE DRAWINGS

In order to achieve a better understanding of the nature of the present invention a preferred embodiment of the credibility scoring system will now be described, by way of example only, with reference to the accompanying drawings in which.

DETAILED DESCRIPTION OF THE INVENTION

Figure 1:
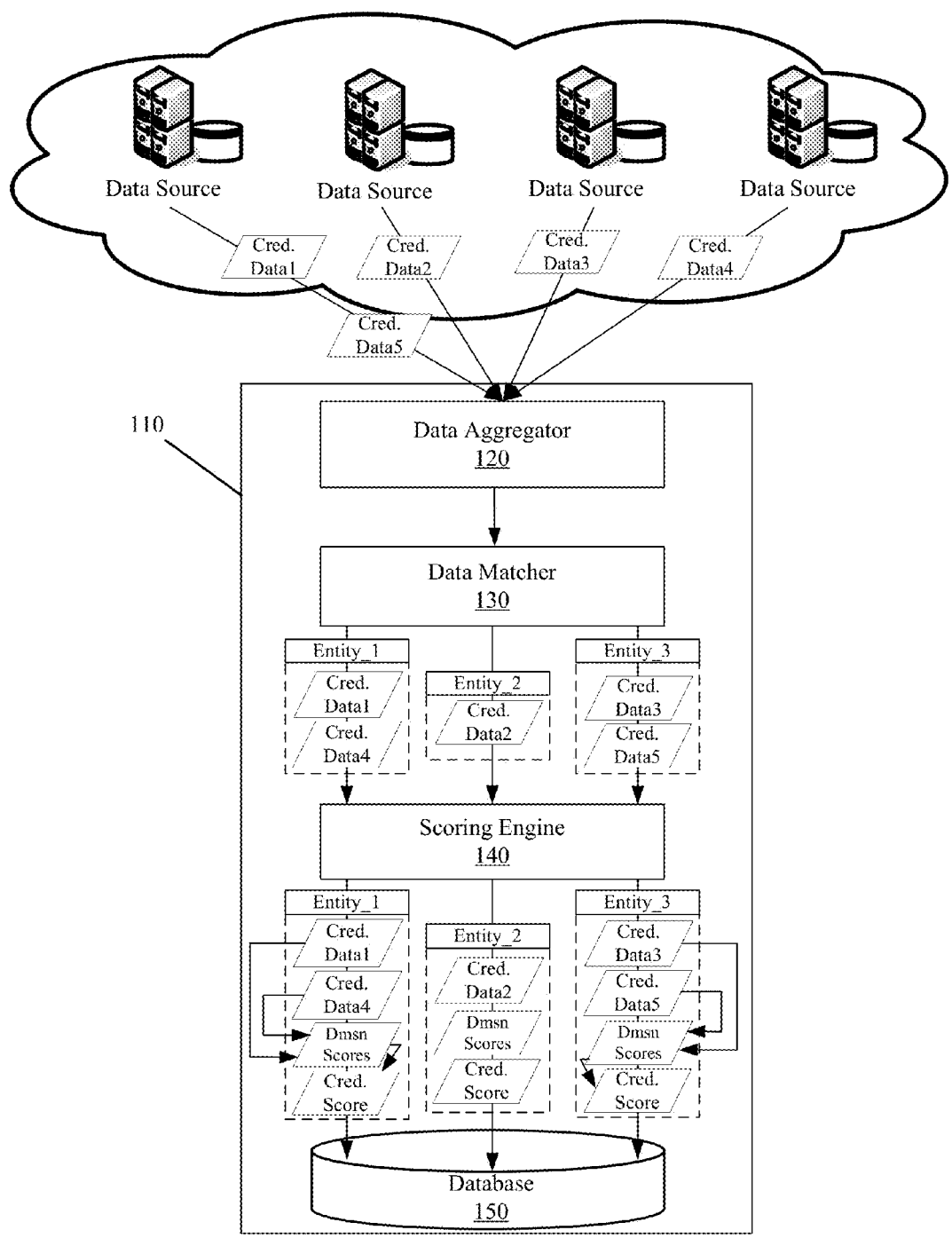
FIG. 1 illustrates functional components of the credibility scoring system that are executed by the special purposed machines or servers of the credibility scoring system in accordance with some embodiments.

In the following detailed description, numerous details, examples, and embodiments of the credibility scoring system are set forth and described. As one skilled in the art would understand in light of the present description, the credibility scoring system is not limited to the embodiments set forth, and the credibility scoring system may be practiced without some of the specific details and examples discussed. Also, reference is made to the accompanying figures, which illustrate specific embodiments in which the credibility scoring system can be practiced. It is to be understood that other embodiments can be used and structural changes can be made without departing from the scope of the embodiments herein described.

I. Overview

Credit scores are fundamental instruments guiding business transactions. However, the authority that is placed on the credit score does not detract from the fact that credit scores serve a very focused and particular use for risk assessment. They do not measure whether a party to a transaction is one that is agreeable, will live up to the terms of the transaction beyond its financial obligations, will produce quality goods and services, will be responsive to the other party, etc. While excluded from the definition of creditworthiness, these are some of the other factors defining entity credibility.

To address the shortcomings of a credit score and to provide comprehensive insight about an entity in a quantifiable manner, some embodiments have produced a credibility score. The credibility score of some embodiments transcends the single dimensional focus of risk assessment as quantified by the credit score. The credibility score of some embodiments is given a multi-dimensional focus with the derivation of each dimension being premised on different factors that contribute and affect entity credibility. This includes without restriction a stability dimension, a transparency dimension, a trustworthiness dimension, and a sentiment dimension. A component score is produced for each dimension and the component scores are then compiled to derive the overall credibility score.

The comprehensive and holistic composition of the credibility score lends the score to be applicable to a variety of business-to-business applications, business-to-consumer applications, and business development applications. Moreover, the credibility score is unlike the credit score in that it allows any entity that has had some experience with some specific entity to provide input that gets factored into the credibility score derivation for that specific entity. The credit score, on-the-other hand, can be affected only by a very limited set of entities (e.g., banks or credit reporting agencies). Because of this diversity of input data, the credibility score is a more informative and holistic account of an entity's qualifications relative to the entity's credit score. Also, the credibility score can be a business development tool for one entity to establish partnerships with others having aligned goals, values, and interests.

Due to the sheer volume of data that is needed to compile the credibility scores of some embodiments for millions of entities, it should be apparent that the derivation and computation of the credibility score is beyond the capabilities of humans and requires an automated machine implementation. Accordingly, some embodiments provide an automated credibility scoring system.

The credibility scoring system is comprised of a set of one or more special purposed machines that autonomously aggregate the multiple dimensions of credibility data and that process the aggregated to data in order to produce the credibility scores for the different entities. Moreover, the credibility scoring system continually collects from its several data sources in order to identify and aggregate new credibility data as it becomes available. In so doing, the credibility scoring system is able to automatically manage and update the credibility scores to keep the scores relevant in terms of time and credibility data.

The credibility scoring system special purposed machines include one or more servers with each server running on physically separate or virtualized hardware as enumerated below in FIG. 10. FIG. 1 illustrates functional components of the credibility scoring system that are executed by the special purposed machines or servers of the credibility scoring system 110 in accordance with some embodiments. As shown, the credibility scoring system includes a data aggregator 120, data matcher 130, scoring engine 140, and database 150. These components transform the servers and their general computing resources into the specialized machines with particularized functionality for producing the credibility scores in accordance with the embodiments provided herein. The credibility scores serve as tangible and salable assets that the credibility scoring system can monetize in various ways.

II. Data Aggregator

The data aggregator 120 is run on a particular purposed machine configured with machine implemented processes for performing large scale data collection and data mining across multiple data sources. The data aggregator 120 collects credibility data from various data sources that are accessible from a data network. Specifically, the data aggregator 120 collects credibility data that is relevant for one or more of the credibility dimensions used in the derivation of the overall credibility score. In some embodiments, the data aggregator 120 is configured with logic to pinpoint and extract credibility relevant data from a data source while excluding data from that data source that does not impact any dimension of the credibility score. Some common data sources mined by the data aggregator 120 include entity websites, government websites and databases, news websites, as well as websites and databases of other data aggregators whose information is relevant to the credibility determination. Some such data aggregators include review sites such as www.yelp.com and www.citysearch.com as some examples. The data aggregator 120 however is configurable to aggregate data from any other network accessible data source in addition to or instead of those enumerated above. Also, the data aggregator 120 can receive data that is digitally inputted by system administrators or other data aggregators working in conjunction with the data aggregator 120.

In some embodiments, the data aggregator 120 associates metadata with each instance of aggregated credibility data that it aggregates from a data source. The metadata can identify where the credibility data was aggregated from. For example, the metadata can specify the data source that was accessed in order to acquire a particular instance of credibility data. The metadata can specify even more granular identifying information in some instances. For example, in addition to or instead of specifying which data source the credibility data was aggregated from, the metadata can also specify which entity account the credibility data was aggregated from, when the credibility data was posted or modified, and links that identify particular credibility data as being related or aggregated from the same site as other aggregated credibility data. The metadata assists the data matcher in associating the aggregated credibility data to the proper entity and associating the aggregated credibility data to the proper credibility dimension. The metadata also assists the scoring engine in scoring the different credibility dimensions and the credibility data.

A. Stability Dimension

In some embodiments, stability is one dimension that is included in the overall derivation of entity credibility. The stability dimension provides a measure of the strength, viability, longevity, and consistency of an entity. A stable entity is one that has been operating for several years and as a result, will likely have survived economic booms and busts. Therefore, from the stability dimension, one can glean the experience level of an entity as well as gain insight into the strength, reliability, and dependability of the entity. Greater credibility is attributed to an entity that has been operating longer than its peers.

Figure 2:
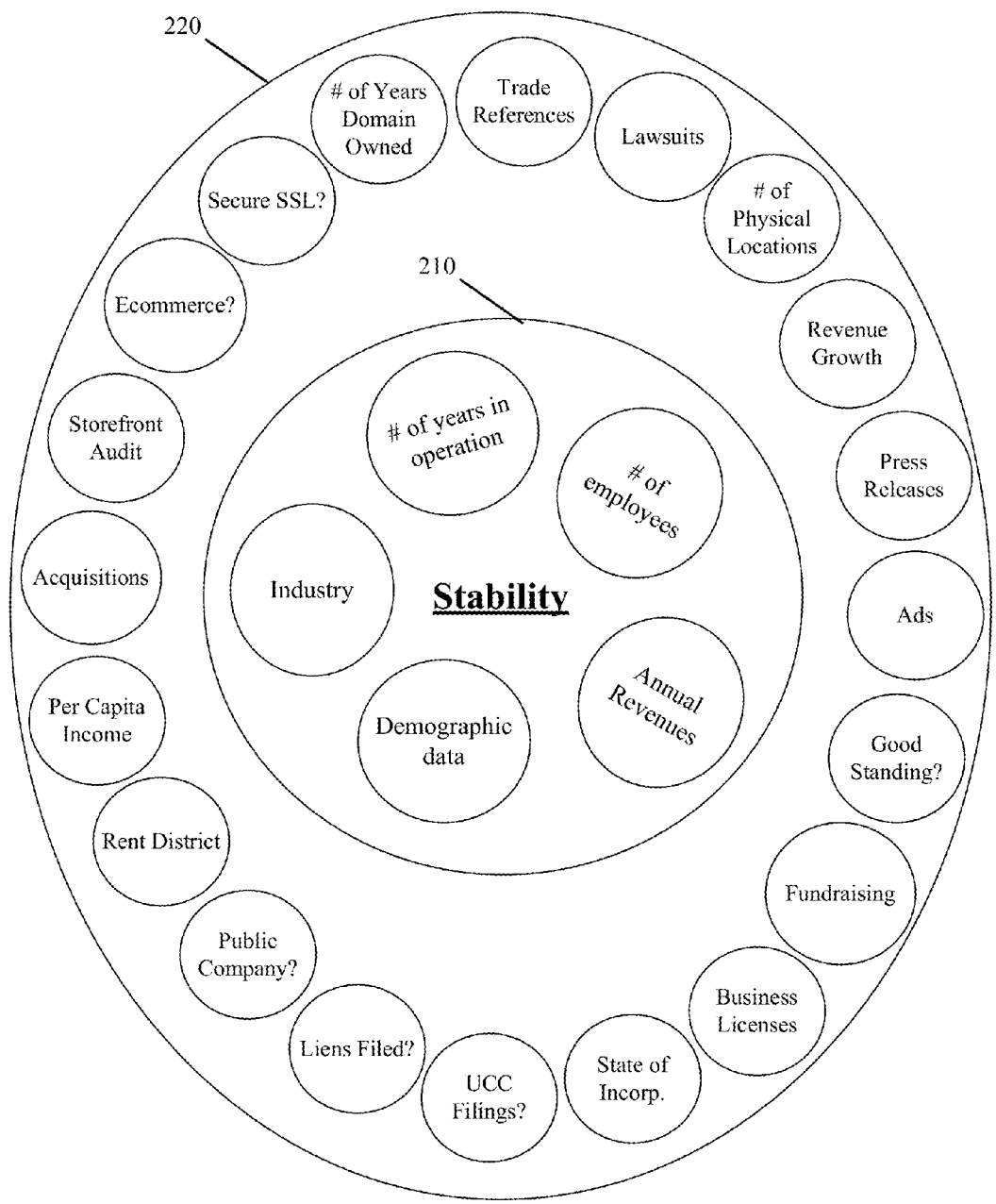
FIG. 2 enumerates some of the credibility relevant data that the data aggregator aggregates for the stability dimension in accordance with some embodiments.

FIG. 2 enumerates some of the credibility relevant data that the data aggregator aggregates for the stability dimension in accordance with some embodiments. The inner ring 210 of credibility data represents the primary data indicators affecting the stability dimension and the outer ring 220 of credibility data represents the second data indicators affecting the stability dimension. In computing the component score that quantifies the stability dimension, the primary data indicators are weighted move heavily in the derivation of the component score than the secondary data indicators.

Primary data indicators affecting the stability dimension include the number of years that the entity has been operational, the number of employees associated with the entity, the annual revenue generated by the entity, demographic data, and industry as some examples. Other credibility relevant data that may be aggregated by the data aggregator in support of the stability dimension include a number of liens filed against the entity, Uniform Commercial Code (UCC) filings, state of incorporation, business licenses, whether the entity is in good standing with various organizations, per capita income, revenue growth, ecommerce availability, rent district, website security, number of years the entity has owned and controlled domain names used in connection with goods and services offered by the entity, trade references, trade submissions, number of physical locations, press exposure (i.e., press releases), advertisement exposure, listing exposure, international presence and exposure, lawsuits filed, lawsuits lost, fines, external investments and funding, acquisitions, venture capital fundraising, and private equity fundraising.

The data aggregator aggregates much of the credibility data for the stability dimension from public data sources. The data aggregator may acquire some of the stability dimension relevant credibility data from secretary of state websites, quarterly statements of public companies, informational releases by the entity (including released financial records), or website (s) of the entity.

B. Transparency Dimension

Entity transparency is another dimension that affects entity credibility. Transparency is a measure of the ease in transacting with a specific entity. The transparency dimension accounts for the reachability and accessibility of the specific entity and provides insight as to whether the specific entity is one that will be responsive and engaged in a relationship or whether the entity will be absent and disengaged from that relationship. Generally, the transparency dimension reveals the identity and activities of an entity such that one has a better understanding with whom they are engaged. Accordingly, transparency increases based on the ease with which an entity can be contacted and the available means with which to engage the entity.

Figure 3:
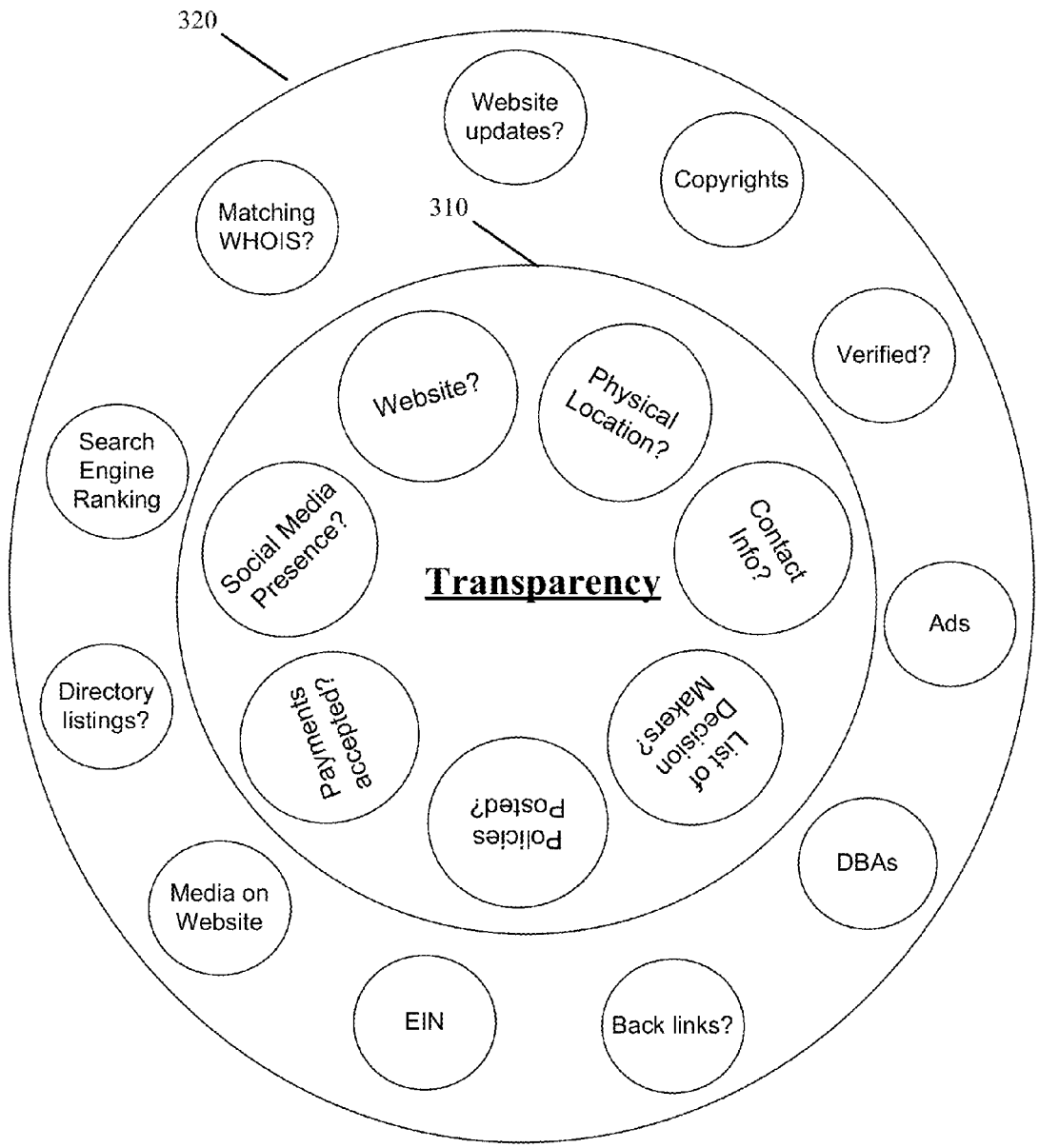
FIG. 3 enumerates some of the credibility relevant data that the data aggregator aggregates for the transparency dimension in accordance with some embodiments.

Some embodiments compile the transparency dimension based on an online presence of the entity and data exposed about the entity through the online presence. FIG. 3 enumerates some of the credibility relevant data that the data aggregator aggregates for the transparency dimension in accordance with some embodiments. As with FIG. 2, the inner ring 310 of credibility data represents the primary data indicators affecting the transparency dimension and the outer ring 320 of credibility data represents the second data indicators affecting the transparency dimension.

Primary data indicators affecting the transparency dimension include whether the entity has its own website, a physical presence (i.e., storefront), contact information (e.g., address, telephone number, and email) that is easily discoverable from the entity website or elsewhere, a listing of the primary decision-makers (e.g., management team, executive team, agents, and representative), an easily discoverable guarantee policy, an easily discoverable return policy, a presence on various social media sites, easily discoverable terms and conditions, an easily discoverable privacy policy, whether the specific entity accepts secure methods of payments, whether the WHOIS record for the specific entity's website matches to the entity's name, and whether the specific entity has a business bank account from which it conducts business. Other credibility relevant data that may be aggregated by the data aggregator in support of the transparency dimension include the timeliness with which the entity updates its website and copyrights, the ranking of the entity's website on various search engines, whether the entity has been verified by one or more verification services, the number of advertisements placed by the entity, listings within various directories, website content, IRS employee identification number (EIN), and any aliases for the entity including (DBAs).

The data aggregator aggregates much of the transparency dimension relevant credibility data from the entity's own website and social media sites such as www.facebook.com, www.twitter.com, etc. The entity website provides a first impression of the entity to others and is the interface with which others can initiate contact with the entity. Moreover, the website can be a point-of-sale from which others can purchase goods and services offered by the entity. Social media sites serve a similar, albeit more indirect, role in ascertaining the transparency of an entity. Entities post various identifying information about themselves on these social media sites with the identifying information expanding the transparency of the entity beyond the exposure provided by the entity's website. The data aggregator may also acquire some of the transparency dimension relevant credibility data from various search engines and publicly accessible directories.

To ensure the accuracy and reliability of the aggregated transparency relevant credibility data, some embodiments cross compare the credibility data that is obtained from different data sources. If the data aggregated from different data sources matches, then the accuracy of that data is confirmed and the component score derived for the transparency dimension can be positively impacted. If the data aggregated from different data sources does not match, then the component score derived for the transparency dimension can be negatively impacted to reflect the mismatched or inaccurate data.

C. Trustworthiness Dimension

Trustworthiness is one dimension that transcends purely objective metrics and is one subjective quantifier within the overall credibility determination. Trustworthiness is a measure of an entity's reputation and provides insight as to whether the entity will fulfill its obligations in a transaction. The trustworthiness dimension is another example where the credibility score of some embodiments provides a more comprehensive and holistic account of an entity relative to a credit score. As a specific example, an entity may have a high credit score because it has zero debt liability and timely pays its bills. However, that same entity may be one that is not insured, is unaccredited, and committed various crimes that are not accounted for in the credit score. The credit score would improperly identify such an entity as one that is safe to conduct business with, whereas the credibility score through the transparency dimension would bring the above identified issues to light.

Figure 4:
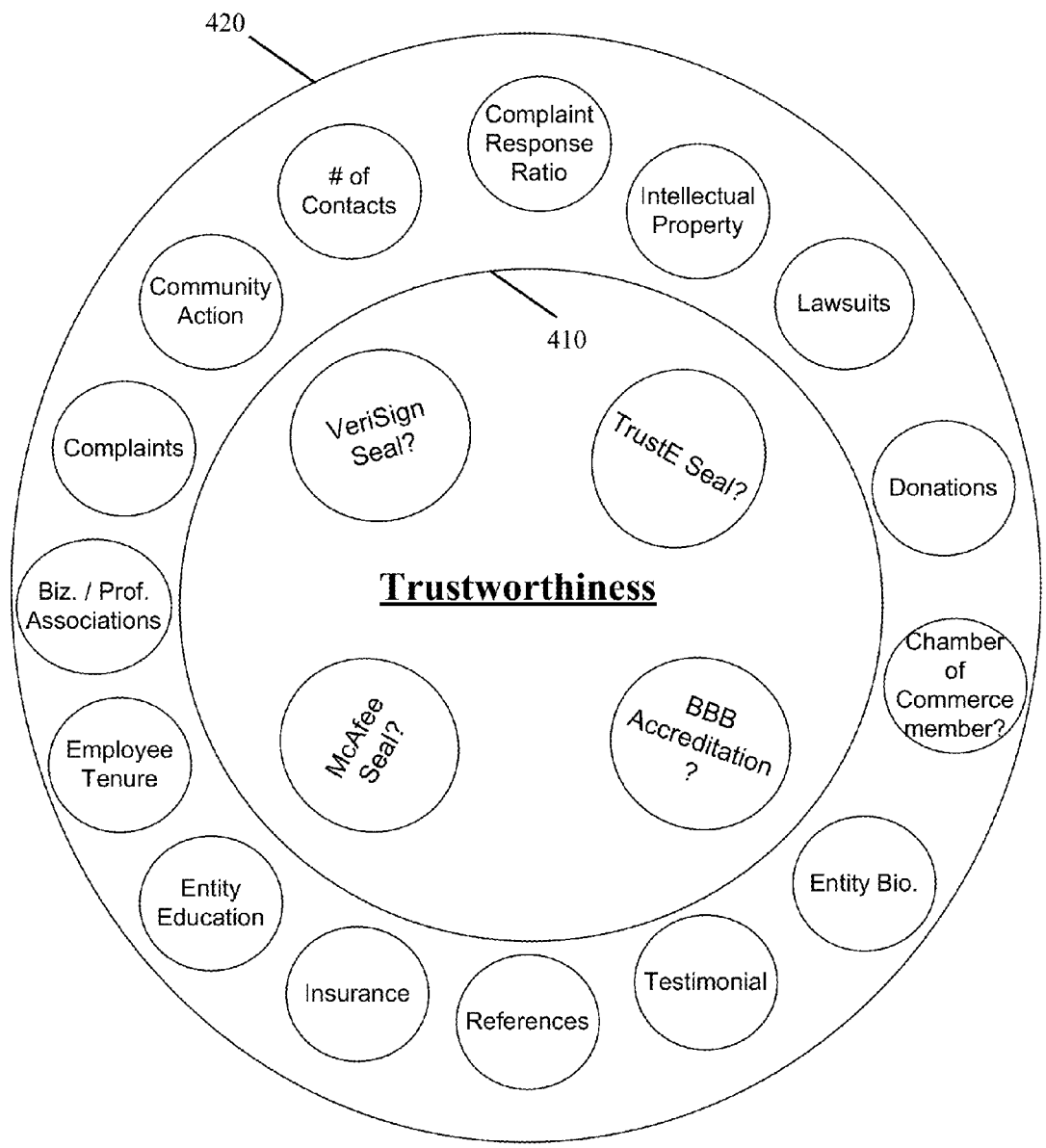
FIG. 4 enumerates some of the credibility relevant data that the data aggregator aggregates for the trustworthiness dimension in accordance with some embodiments.

Some embodiments compile the trustworthiness dimension based on discovered legal actions, complaints that others have logged about the entity, and accreditations of the entity by others as some examples. FIG. 4 enumerates some of the credibility relevant data that the data aggregator aggregates for the trustworthiness dimension in accordance with some embodiments. The primary data indicators affecting the trustworthiness dimension are shown in the inner ring 410 of credibility data and the second data indicators are shown in the outer ring 420.

Primary data indicators affecting the trustworthiness dimension include whether the entity is verified or accredited with agencies that provide various recognized accreditations or verifications. Some such accreditations include those provided by VeriSign, TrustE, McAfee, and the Better Business Bureau (BBB) as some examples. It should be apparent to one of ordinary skill in the art that this list is meant to be exemplary and not exhaustive or restrictive. In other words, other accreditations can at any time be included in the trustworthiness determination. Other credibility relevant data that may be aggregated by the data aggregator in support of the trustworthiness dimension include the number of complaints targeting the entity on publicly available sites, the number of contacts that the entity has on publicly available sites, the intellectual property owned by the entity (i.e., patents and trademarks), the entity's community involvement, donations made by the entity, whether the entity is member and participant in the relevant chamber of commerce, whether the entity has been or is the subject of legal disputes, whether the entity has provided a list of references, whether the entity is insured and accredited with the relevant agencies, the education level of the entity, the tenure of the entity's employees, whether the entity is part of business or professional associations, whether testimonials by others attest to the trustworthiness of the entity, the presence of the entity's biography and the accuracy of the provided data.

D. Sentiment Dimension

Like trustworthiness, sentiment is another dimension that transcends purely objective metrics, relying instead on a combination of objective metrics and subjective metrics for its derivation. The sentiment dimension accounts for the experience that others have had in their engagement with the entity. Unlike the credit score which restricts the input used in its formulation to a select set of data providers, the sentiment dimension is comprehensive by virtue that it accepts input from anyone that has had an experience with the targeted entity and that has posted about that experience. Moreover, the credibility data from which the sentiment dimension is derived can be directed to any aspect of an entity. The sentiment dimension therefore provides insight on how customers and peers regard an entity according to any factor that is deemed important by those customers and peers.

Figure 5:
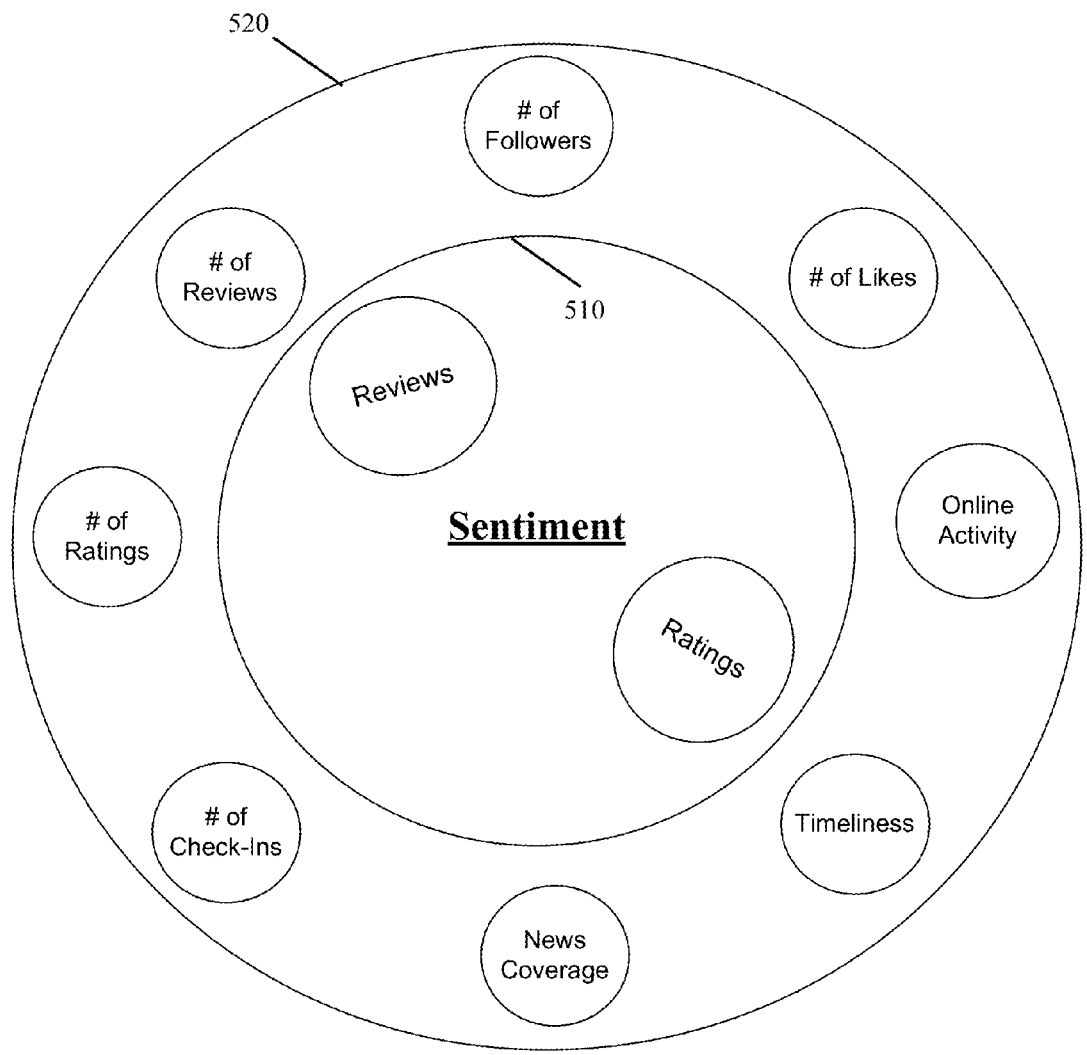
FIG. 5 enumerates some of the credibility relevant data that the data aggregator aggregates for the sentiment dimension in accordance with some embodiments.

Some embodiments compile the sentiment dimension based on reviews and ratings that others have posted about an entity on various online sites. FIG. 5 enumerates some of the credibility relevant data that the data aggregator aggregates for the sentiment dimension in accordance with some embodiments. The primary data indicators affecting the sentiment dimension are illustrated by the inner ring 510 of credibility data and the second data indicators are illustrated by the outer ring 520 of credibility data.

Primary data indicators affecting the sentiment dimension include quantitative ratings and qualitative reviews. The quantitative ratings provide some quantifiable value within a defined range of values. For example, a three out of five star rating and score of 95 out of 100 are two different quantitative ratings. The qualitative reviews include textual statements that convey some degree of positivity or negativity towards an entity or some aspect of the entity. Accordingly, a comment or blog can serve as a review. In some embodiments, the data aggregator collects the ratings and reviews credibility data from various online sites including review sites such as www.yelp.com, www.zagat.com, and www.citysearch.com, as well as social media sites (e.g., www.facebook.com and www.twitter.com), news sites, blogs, and other sites that publicly display posts that other have published. Other credibility relevant data that may be aggregated by the data aggregator in support of the sentiment dimension include how many "followers" an entity has, how many "likes" are given to an entity, the number of ratings and reviews aggregated for an entity, timeliness of the ratings and reviews, news coverage and other articles expressing positivity or negativity towards an entity, and the number of times others have "checked-in" with an entity.

III. Data Matcher

The data matcher performs the task of associating the credibility data that is aggregated by the data aggregator to the proper entity. In some embodiments, the data matcher relies on the metadata that the data aggregator associates with the aggregated credibility data in order to associate the credibility data to the correct entity. For example, when the metadata identifies an entity's own website as being the source from which credibility data is aggregated, the data matcher can rely on that metadata to associate the credibility data to the entity.

In some embodiments, the data matcher relies on the content of the credibility data to associate the aggregated credibility data to the correct entity. For example, aggregated review credibility data can include a textual statement that includes words or phrases identifying an entity that is the target of that review.

In either instance, the accuracy of the credibility data to entity association can be improved by providing the data matcher access to a database of known entities. The data matcher can then query the database using words and phrases from the credibility data to identify which words or phrases identify an entity. Subsequent natural language processing of the textual statement can then differentiate between the one or more entities that are the subjects or targets of the credibility data and other entities merely mentioned in the textual statement. The database can also be used to identify an entity from its aliases or usernames. The credibility scoring system can host the database or can access the database of a third party that hosts such information. Governmental sites maintain databases for known entities.

In some embodiments, the data matcher also classifies the credibility data to identify what credibility dimension the data relates and, more specifically, the specific data indicator of the credibility dimension to which the data relates. To do so, the data matcher performs some minimal processing of the metadata or the credibility data content. For example, when the metadata identifies the credibility data as having been aggregated from a review site such as www.yelp.com, the data matcher can classify that credibility data as relating to the sentiment dimension and as applying to the reviews data indicator of the sentiment dimension. Similarly, when the credibility data is aggregated from one or more accreditation agencies, the data matcher can classify that credibility data as relating to the trustworthiness dimension and as applying to the primary data indicators of the trustworthiness dimension.

For credibility data that the data matcher cannot accurately associate to any entity, the credibility data can be discarded or temporarily stored to allow a system administrator or other users of the system to resolve the matching. It should be noted that the data matcher can associate the same instance of aggregated credibility data to two or more entities. Similarly, the data matcher can classify one instance of aggregated credibility data as affecting two or more credibility dimensions.

IV. Scoring Engine

The scoring engine produces each of the component credibility scores from the matched credibility data. The scoring engine then compiles the component credibility scores for a particular entity in order to produce the overall credibility score for that particular entity. The discussion will continue describing the derivation of the credibility component scores and overall credibility score based on the stability, transparency, trustworthiness, and sentiment dimensions. However, the credibility scoring system can be modified to include other credibility data for other dimensions in addition to or in place of the dimensions that are enumerated herein.

Figure 6:
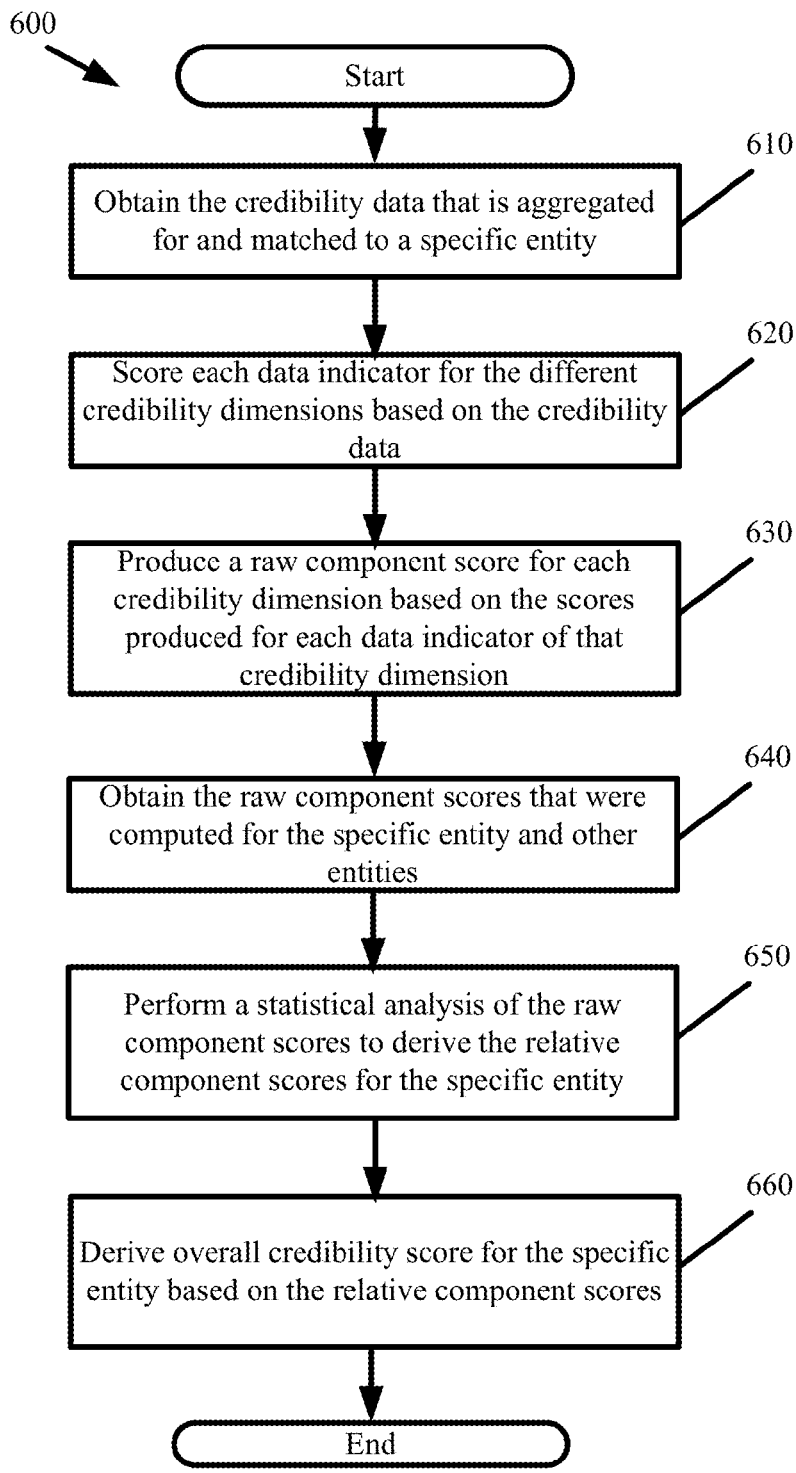
FIG. 6 presents a process performed by the scoring engine for computing a component credibility score in accordance with some embodiments.

FIG. 6 presents a process 600 performed by the scoring engine for computing a component credibility score in accordance with some embodiments. The process 600 is generally applicable and can be used to compute the component credibility score for any credibility dimension.

The process 600 commences by obtaining (at 610) the credibility data that is aggregated for and matched to a specific entity. The process then scores (at 620) each data indicator for the different credibility dimensions based on the credibility data that the data matcher matches to each data indicator of each credibility dimension. The processing engine is encoded with a set of rules for automatically scoring the data indicators based on the different factors described below.

One factor is simply whether the system was able to successfully aggregate credibility data for the credibility indicator or whether no credibility data was available for that indicator. For instance, one dimensional indicator of the transparency dimension quantifies whether the entity's website lists or does not list the primary decision-makers or management team. Accordingly, the scoring engine produces a first score when credibility data for that credibility indicator is available and a second score when credibility data is not available for that credibility indicator, wherein the first score positively impacts the transparency dimension and the second score negatively impacts the transparency dimension. When the credibility data for the specific indicator is difficult to obtain (e.g., is obtainable for less than 50% of all entities), the scoring engine will not negatively impact the credibility of the entity, though it may positively impact the credibility of the entity when that data is available.

The scoring at 620 can also depend on the value of the aggregated data. For instance, one data indicator of the stability dimension is the number of years the entity has been in operation. In this instance, the greater the value for the credibility data that is aggregated for that data indicator, the greater the score that is attributed to that data indicator. More specifically, the credibility scoring system can predefine thresholds for the different data indicators. When the credibility data for a particular data indicator exceeds the threshold, the credibility data can be quantified into a score that positively impacts a component score and overall credibility score. Otherwise, the credibility data can be quantified as a score that negatively impacts the scoring or as a neutral score that does not impact the scoring.

In some embodiments the thresholds are fixed for certain data indicators while other thresholds are dynamically determined from other aggregated credibility data. For example, when a first entity generates a particular amount of revenue after operating for ten years in a specific geographic region and industry, and a second entity generates the same particular amount of revenue after operating for five years in the specific geographic region and industry, the credibility scoring system will dynamically set different thresholds to gauge the credibility of the first and second entities. Specifically, since the second entity was able to generate the same revenue as the first entity in only half the time, the second entity may be deemed more credible and may be given a higher score for the corresponding credibility indicator.

The scoring at 620 can also depend on data consistency. The data aggregator may aggregate different credibility data for the same credibility indicator from different data sources. The credibility data that is aggregated from a first data source may match the credibility data that is aggregated from a second data source, thereby corroborating the data as well as confirming the accuracy of the data. In such cases, the scoring engine produces a higher score for that data indicator as the credibility data for the entity is consistently presented across different sites. However, it may be the case that the credibility data that is aggregated from the first data source may be different from the credibility data that is aggregated from a second data source. In such cases, some of the credibility data for the entity is known to be inaccurate, outdated, or otherwise false. Accordingly, the scoring engine will lower the score for that data indicator, thereby lowering the score for the dimensional component that is derived using that data indicator. For example, one site may list a current address for a particular entity and another site may list a previous address for the particular entity that is no longer correct. Similarly, one site may list a current and correct first set of executives and another site may provide an old listing of executives. In such cases, the scoring engine will lower the score that is computed for the respective data indicators because the data is inconsistent and the data incorrectly conveys the credibility for that particular entity.

Based on the data indicator scores that are produced for each particular credibility dimension, the process next produces (at 630) a raw component score for the particular credibility dimension. The compilation can be a simple average of the data indicator scores or a weighted computation. When producing the raw component score according to the weighted computation, the processing engine factors the importance of each data indicator in computing the raw component score. For example, the primary data indicators in FIGS. 2-5 may be provided greater weight than the secondary data indicators such that the scores resulting from the primary data indicators have a greater impact on the component credibility scores than the scores resulting from the secondary data indicators.

The weights attributed to the various data indicators are determined based on a classification modeling and ensemble method. The classification modeling determines which data indicators accurately predict certain outcomes. For example, the classification modeling may reveal that companies that have been operating for more than three years and that have fewer than ten employees have a 85% chance of declaring bankruptcy in the near term. Accordingly, the data indicators relating to the number of years in operation and the number of employees will become primary data indicators for the stability dimension and will be weighted more heavily in producing the raw stability dimension component scores. As these classifications vary over time, the classification model will change to account for the variance, thereby maintaining the relevance and accuracy of the credibility score to contemporary trends in assessing entity credibility.

The ensemble method performed by the scoring engine aggregates predictions of the classification model. The aggregate predictions are then quantified into the raw component scores. Some embodiments utilize one or more of a random forest, logistic regression, and multivariate adaptive regression when executing the ensemble method.

The raw component scores for the different credibility dimensions are isolated scores in that they do not provide any comparative insight as to how the credibility dimensions of the specific entity relate to other entities. In other words, there is no frame of reference that suggests whether a score means the entity is credible or not credible even when the score is computed in a fixed range. This is because credibility is fundamentally a relative measurement based on how one entity compares to its peers or other set of entities. Accordingly, the process converts the raw component scores to relative component scores by adjusting the raw component scores of each entity in view of the raw component scores of other entities.

To do so, the process obtains (at 640) the raw component scores that were computed for the specific entity and other entities or, more specifically, the specific entity's peers. The process then performs (at 650) a statistical analysis of the raw component scores to produce the relative component scores for the specific entity. The statistical analysis involves, for each credibility dimension, analyzing the distribution of the raw component scores for a set of entities, wherein the set of entities can be all entities, entities in a specified geographic region, entities in a particular industry, entity peers, or some combination or permutation thereof. As part of the distribution analysis, the scoring engine determines the relative component scores for the specific entities based on how the raw component scores for the specific entity cluster with the raw component scores of the set of entities.

Figure 7:
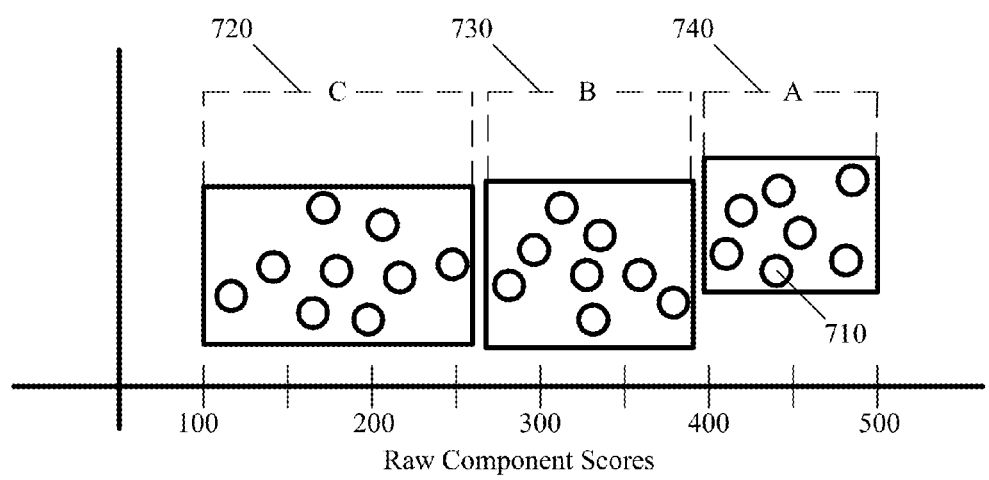
FIG. 7 illustrates determining a specific entity's relative component score for a particular credibility dimension based on the clustering of the specific entity's raw component score with the raw component scores of other entities in the particular credibility dimension.

FIG. 7 illustrates determining a specific entity's relative component score for a particular credibility dimension based on the clustering of the specific entity's raw component score with the raw component scores of other entities in the particular credibility dimension. The figure illustrates a distribution of raw component scores for several entities across the x-axis. The raw component scores range in value from 100 to 500. Within this distribution is the raw component score for a particular entity of interest 710. The scoring engine then identifies a clustering of the raw component scores into three clusters 720, 730, and 740. The raw component scores are then converted to a relative component score of A, B, or C based on whichever cluster the raw component scores fall within. As shown, the raw component score for the particular entity 710 falls within the cluster that is provided the relative component score of A. Accordingly, the relative component score for the particular entity is A.

Once the relative component score has been determined for each credibility dimension, the processing engine then derives (at 660) the overall credibility score for the entity based on those component credibility scores. Here again, the overall credibility score can be derived as an average of the relative component scores for each credibility dimension or it can be derived based on a weighted differentiation in which each of the relative component scores contributes differently to the derivation of the overall credibility score.

Figure 8:
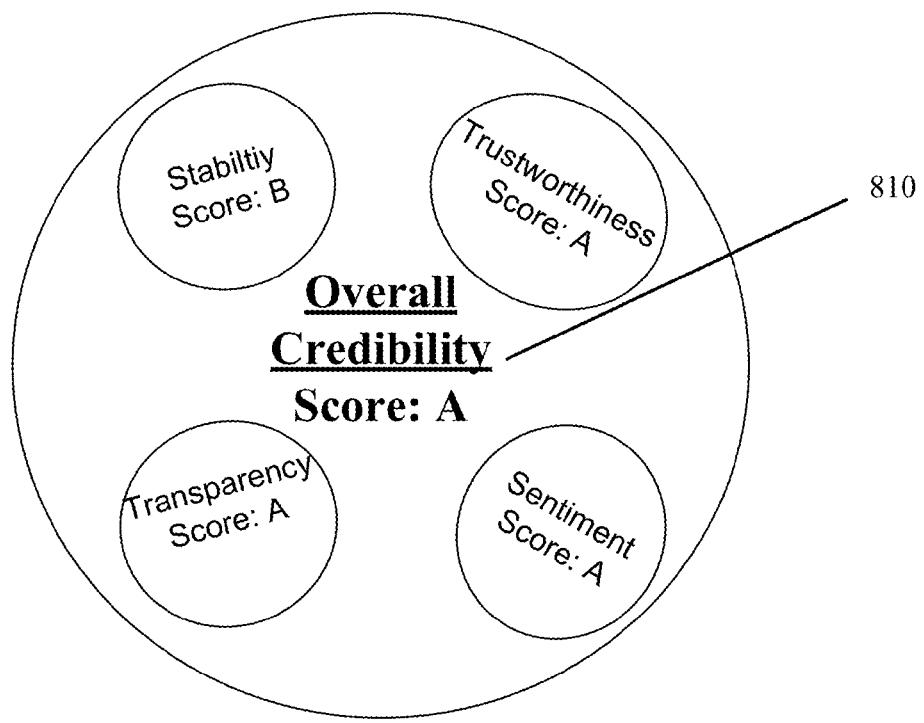
FIG. 8 illustrates an overall credibility score that is produced based on the stability, transparency, trustworthiness, and sentiment dimensions.

FIG. 8 illustrates an overall credibility score 810 that is produced based on the stability, transparency, trustworthiness, and sentiment dimensions and, more specifically, produced based on the relative component scores for each of those dimensions. In some embodiments, the credibility scoring system produces the overall credibility score on only two or more of the dimensions when sufficient credibility data is not available to produce accurate component scores for the omitted dimensions. In such cases, the credibility score will still be multi-dimensional because it accounts for at least two dimensions and will still accurately convey entity credibility as the component scores that are used are still generated according to the relative analysis described above.

V. Database

The database stores the aggregated credibility data along with the produced raw and relative component scores and overall credibility scores for all entities. In some embodiments, the database organizes the aggregated credibility data and scores in an entity-by-entity basis. Accordingly, the database creates a record for each unique entity with each entity record storing the aggregated credibility data that is matched to the corresponding entity as well as any scores (i.e., component or overall) that are produced for that entity.

The data and scores within the database are continually updated based on credibility data that the data aggregator newly aggregates over time. This can include new credibility data for an entity that was not previously available or updated data that replaced previously aggregated data.

The credibility scoring system produces various tangible and salable assets based on the credibility data and scores stored to the database. Users can access or otherwise purchase these assets by accessing a credibility scoring system website or by accessing a website of a credibility scoring system partner. In some embodiments, access to one or more of the assets is freely provided, while access to other assets may be provided for a fee.

The basic asset is the overall credibility score. Other assets include reports that detail the composition and derivation of the overall credibility score. A report can be generated for a particular entity using the credibility data and component scores (i.e., relative and/or raw) that are stored the particular entity's record in the database. Some reports detail the derivation of the overall credibility score by providing each of the relative or raw component scores used in deriving the overall credibility score. Other reports detail the derivation of the overall credibility score by providing the relative or raw component scores in conjunction with the credibility data that is used in computing each of the relative component scores.

Figure 9:
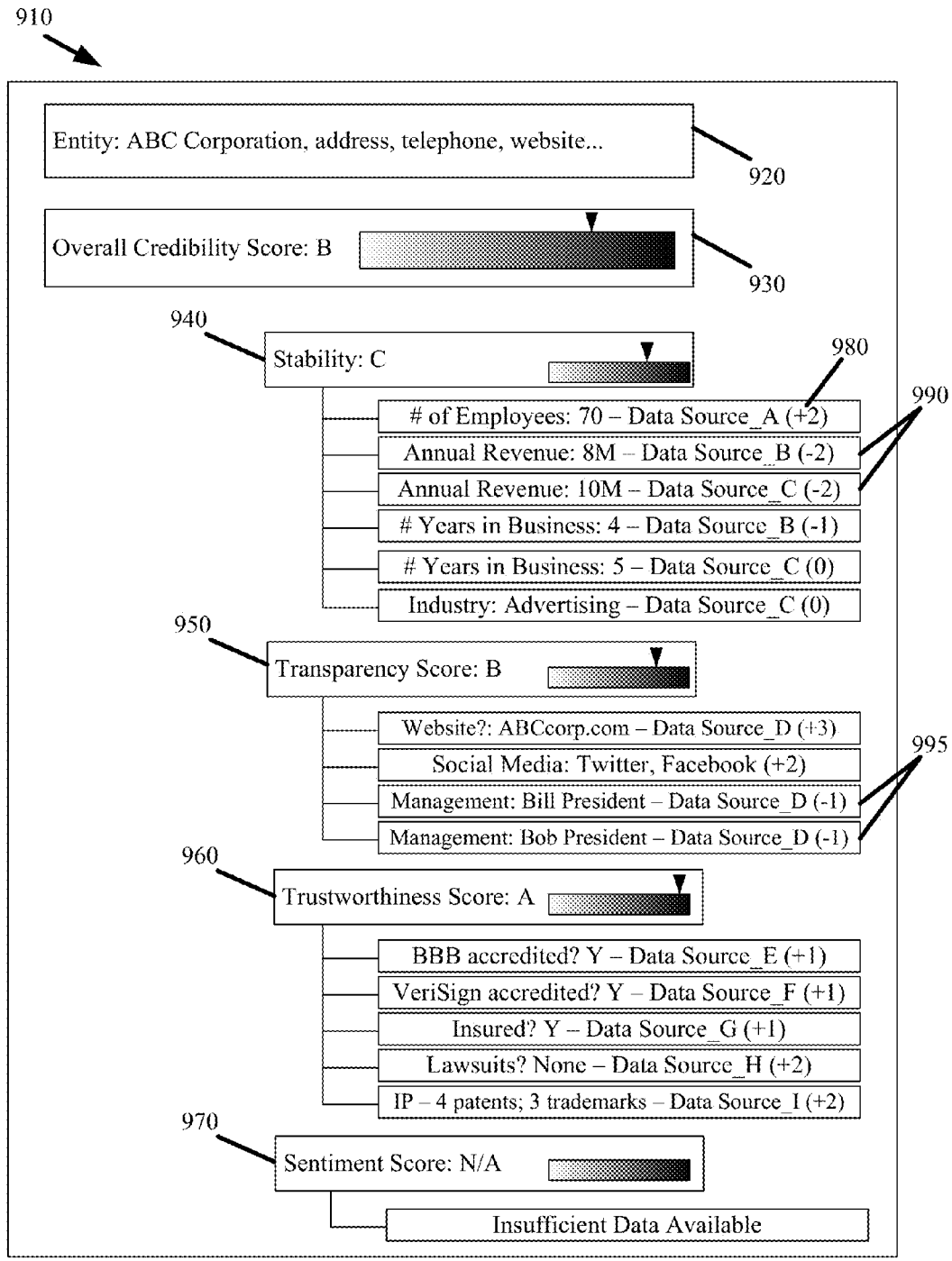
FIG. 9 provides an exemplary credibility report in accordance with some embodiments.

FIG. 9 provides an exemplary credibility report 910 in accordance with some embodiments. The credibility report 910 provides a detailed and comprehensive account of a particular entity's credibility. The report 910 begins by identifying at 920 the entity to which the report relates. The report 910 then presents the entity's overall credibility score at 930. In this figure, the overall credibility score and the component scores are shown in a range of A-F with the score of "A" connoting a highly credible entity and "F" connoting an entity that is not credible. It should be apparent that any range or scale of values can be used to quantify the various scores. The overall credibility score provides quick and summary insight as to the entity's credibility. Below the overall credibility score, the report details the various credibility dimensions from which the overall credibility score 930 is derived. This includes presenting the relative component score for each of the credibility dimensions to provide the viewer with a quick summary of each dimension. In this exemplary report, a relative component score is shown for the stability dimension at 940, a relative component score is shown for the transparency dimension at 950, a relative component score is shown for the trustworthiness dimension at 960, however no score is provided for the sentiment dimension at 970 because the credibility scoring system was unable to aggregate sufficient credibility data to accurately score that dimension.

Beneath or adjacent to each relative component score, the report details the credibility data used in compiling the relative component score. This presentation of the credibility data may be summarized so as to present the credibility data for the primary data indicators that primarily impact the relative component score or to present the credibility data that otherwise significantly impacts the relative component score. Each instance of credibility data can be provided an individual score (see parenthetical 980) so that the viewer can ascertain its impact on the relative component score. Each instance of credibility data can also identify the data source from which it was aggregated.

The reports can be leveraged to better involve and engage the entities in the credibility scoring process as well as allow entities to manage their credibility from a single point of reference. When an entity views a report detailing the various scores and credibility data used in deriving the scores, the entity can identify the credibility data that detrimentally affects its scores and take corrective action as desired. For example, reference markers 990 and 995 in FIG. 9 identify inconsistent or inaccurate aggregated credibility data as well as identify the data source(s) from which the credibility data is aggregated. The entity can then update or otherwise correct the credibility data with the data source(s) or can submit data directly to the credibility scoring system to correct the error. When the credibility scoring system aggregates the updated or corrected credibility data, that credibility data will be used to update the scores, thereby increasing the entity's scores. This is a powerful tool for the entity because it allows the entity to track what information different websites post about the entity by simply referencing the report without the need to continually monitor each of the different websites. From the report, the entity can also identify credibility data that is unavailable to the credibility scoring system and the entity can then manually submit that credibility data through an interface of the credibility scoring system such that the manually submitted credibility data is later included in the credibility score derivation.

VI. Server System

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, portable digital assistants, tablet devices, laptops, and servers. Examples of computer-readable media include, but are not limited to, CD-ROMs, flash drives, RAM chips, hard drives, EPROMs, etc.

Figure 10:
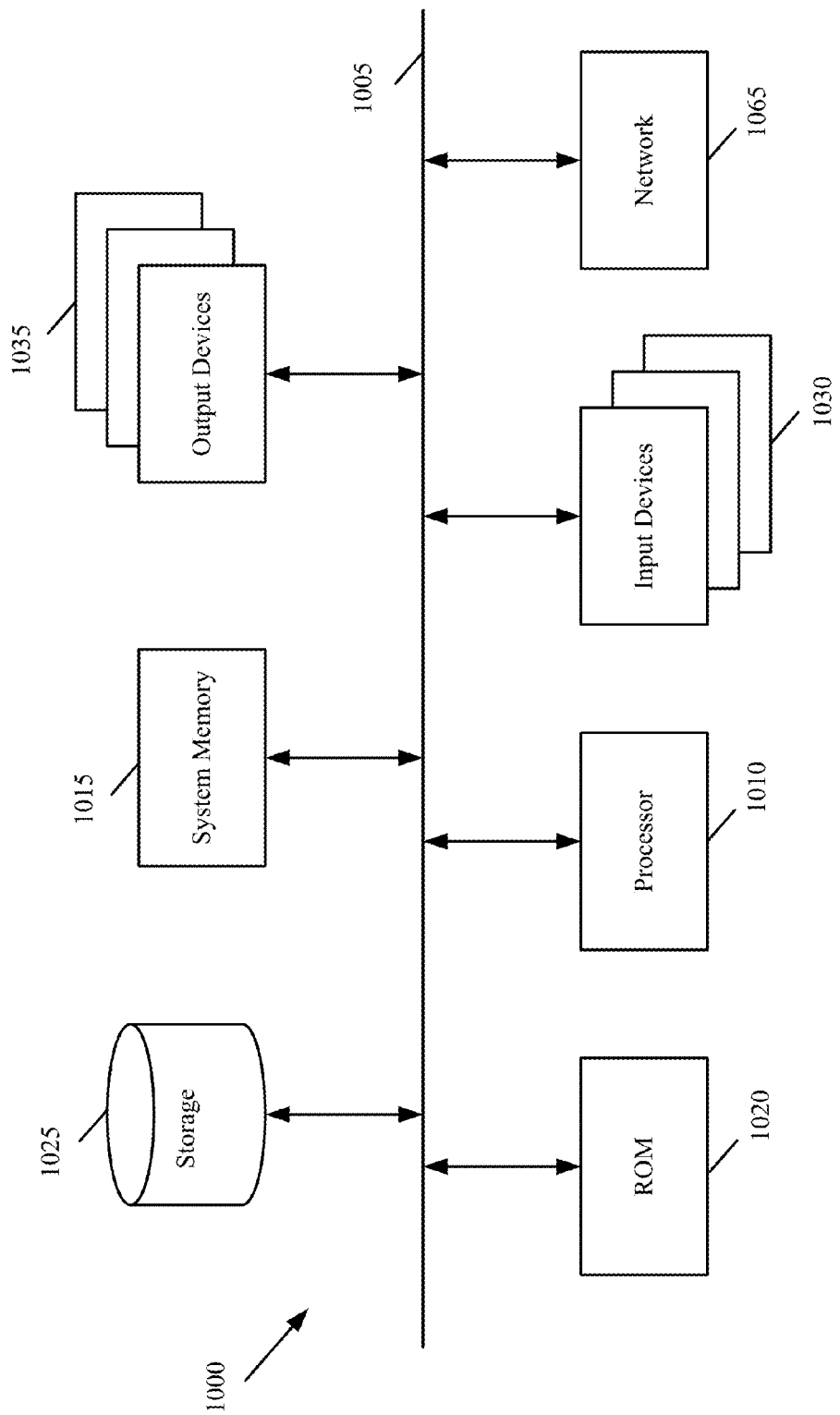
FIG. 10 illustrates a computer system with which some embodiments are implemented.

FIG. 10 illustrates a computer system with which some embodiments are implemented. Such a computer system includes various types of computer-readable mediums and interfaces for various other types of computer-readable mediums that implement the various processes, modules, and engines described above for the credibility scoring system and its components (e.g., data aggregator, data matcher, and scoring engine). Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device. Like the permanent storage device 1025, the system memory 1015 is a read-and-write memory device. However, unlike storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include any of a capacitive touchscreen, resistive touchscreen, any other touchscreen technology, a trackpad that is part of the computing system 1000 or attached as a peripheral, a set of touch sensitive buttons or touch sensitive keys that are used to provide inputs to the computing system 1000, or any other touch sensing hardware that detects multiple touches and that is coupled to the computing system 1000 or is attached as a peripheral. The input device 1030 also include alphanumeric keypads (including physical keyboards and touchscreen keyboards), pointing devices (also called "cursor control devices"). The input devices 1030 also include audio input devices (e.g., microphones, MIDI musical instruments, etc.). The output devices 1035 display images generated by the computer system. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the internet. For example, the computer 1000 may be coupled to a web server (network 1065) so that a web browser executing on the computer 1000 can interact with the web server as a user interacts with a GUI that operates in the web browser.

As mentioned above, the computer system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for providing a multi-dimensional presentation of entity credibility, the computer-implemented method comprising:
   with a processor of at least one machine of a credibility scoring system comprising a data aggregator, data matcher, and scoring engine:
      aggregating from a plurality of data sources to the data aggregator, a plurality of credibility data directed to a particular entity;
      grouping, by operation of the data matcher, the plurality of credibility data to at least a first group and a second group, said first group comprising a first subset of the plurality of credibility data that is directed to a first credibility dimension and said second group comprising a second different subset of the plurality of credibility data that is directed to a second different credibility dimension;
      computing, by operation of the scoring engine, a first score quantifying the first credibility dimension using the first subset of the credibility data;
      computing, by operation of the scoring engine, a second score quantifying the second credibility dimension using the second subset of the credibility data; and
      producing, by operation of the scoring engine, an overall credibility score for the particular entity from the first score and the second score.

2. The computer-implemented method of claim 1 further comprising filtering from the plurality of credibility data, (i) credibility data comprising one of sentiment, stability, trust, and transparency indicators as the first subset of credibility data for the first credibility dimension and (ii) credibility data comprising another of the sentiment, stability, trust, and transparency indicators as the second subset of credibility data for the second credibility dimension.

3. The computer-implemented method of claim 1, wherein computing the first score comprises computing a raw score based on the first subset of credibility data and adjusting the raw score according to a distribution to produce the first score, said distribution comprising raw scores of other entities that are computed from other credibility data that is directed to the first credibility dimension.

4. The computer-implemented method of claim 1 further comprising presenting the overall credibility score with the first score and the second score.

5. The computer-implemented method of claim 4 further comprising presenting the first subset of credibility data in connection with presenting the first score and presenting the second subset of credibility data in connection with presenting the second score.

6. The computer-implemented method of claim 4 further comprising producing a report comprising (i) the overall credibility score, (ii) a first credibility dimension comprising the first score and the first subset of credibility data, and (iii) a second credibility dimension comprising the second score and the second subset of credibility data.

7. The computer-implemented method of claim 1, wherein the first subset of the credibility data comprises reviews and ratings that are directed to the particular entity and the second subset of the credibility data comprises historical data about the particular entity.

8. A computer-implemented method for generating a multi-dimensional credibility score, the computer-implemented method comprising:
   with a processor of at least one machine of a credibility scoring system comprising a data matcher and scoring engine:
      compiling using the data matcher, a first set of credibility data directed to a particular entity and further directed to a first credibility dimension of a plurality of credibility dimensions from any of a plurality of data sources;
      compiling using the data matcher, a second set of credibility data directed to the particular entity and further directed to a second credibility dimension of the plurality of credibility dimensions from any of the plurality of data sources;
      deriving using the scoring engine, a credibility score for the particular entity from the first and second sets of credibility data; and
      presenting from the credibility scoring system, the credibility score in response to an inquiry about the particular entity's credibility.

9. The computer-implemented method of claim 8 further comprising aggregating a plurality of credibility data from the plurality of data sources.

10. The computer-implemented method of claim 9, wherein compiling the first set of credibility data comprises filtering the first set of credibility data from the plurality of credibility data, and wherein compiling the second set of credibility data comprises filtering the second set of credibility data from the plurality of credibility data.

11. The computer-implemented method of claim 8, wherein the first set of credibility data comprises reviews and ratings containing sentiment that others have expressed toward the particular entity.

12. The computer-implemented method of claim 11, wherein deriving the credibility score is based in part on a degree of positivity and negativity expressed towards the particular entity in the sentiment from the reviews and ratings of the first set of credibility data.

13. The computer-implemented method of claim 12, wherein the second set of credibility data comprises historical information about the particular entity.

14. The computer-implemented method of claim 13, wherein deriving the credibility score is further based in part on at least one of an amount of historical information about the particular entity that is available and consistency in said historical information.

15. The computer-implemented method of claim 12, wherein the second set of credibility data comprises trust indicators provided by others that attest to the trustworthiness of the particular entity.

16. A non-transitory computer-readable storage medium with an executable program stored thereon, wherein the program instructs a processor of at least one machine of a credibility scoring system comprising a data matcher and scoring engine to perform sets of instructions for:
   compiling a first set of credibility data directed to a particular entity and further directed to a first credibility dimension of a plurality of credibility dimensions using the data matcher;

compiling a second set of credibility data directed to the particular entity and further directed to a second credibility dimension of the plurality of credibility dimensions using the data matcher; and generating using the scoring engine, a credibility report comprising (i) a first section presenting the first credibility dimension with a first score and the first set of credibility data from which the first score is derived, (ii) a second section presenting the second credibility dimension with a second score and the second set of credibility data from which the second score is derived, and (iii) a third section presenting overall credibility of the particular entity as a third score derived in part from the first and second scores.

17. The non-transitory computer-readable storage medium of claim 16, wherein the program further instructs the processor to perform a set of instructions for producing the first score from positive and negative sentiment that is expressed in the first set of credibility data.

18. The non-transitory computer-readable storage medium of claim 16, wherein the first set of credibility data comprises online posts with sentiment directed to the particular entity, and wherein the second set of credibility data comprises information about the particular entity that is aggregated from an online presence of the particular entity.

19. The non-transitory computer-readable storage medium of claim 16, wherein the program further instructs the processor to perform a set of instructions for aggregating from a plurality of data sources, a plurality of credibility data comprising the first and second sets of credibility data and matching the first set of credibility data and the second set of credibility data from the plurality of credibility data to the particular entity.

20. The non-transitory computer-readable storage medium of claim 16, wherein the program further instructs the processor to perform a set of instructions for storing the credibility report to the non-transitory computer-readable storage medium for subsequent retrieval and presentation in response to a query for a credibility report of the particular entity.

* * * * *